Oct. 9, 1956

H. F. HAMBURG 2,766,349

DIFFERENTIAL PRESSURE SWITCH

Filed Feb. 16, 1954

INVENTOR
Henry F. Hamburg
BY
Wooster & Davis
ATTORNEYS

Oct. 9, 1956      H. F. HAMBURG      2,766,349
DIFFERENTIAL PRESSURE SWITCH
Filed Feb. 16, 1954      2 Sheets-Sheet 2
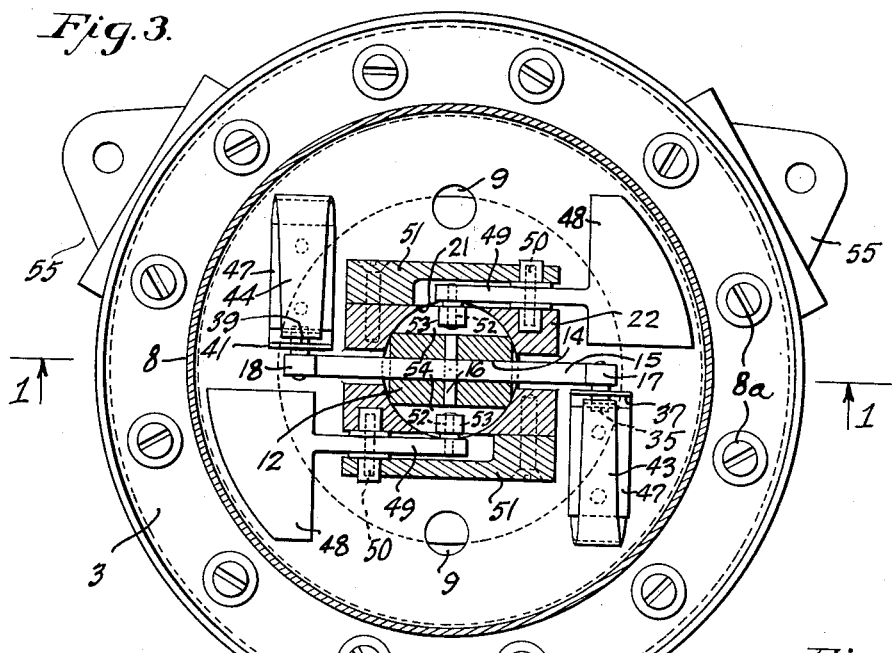
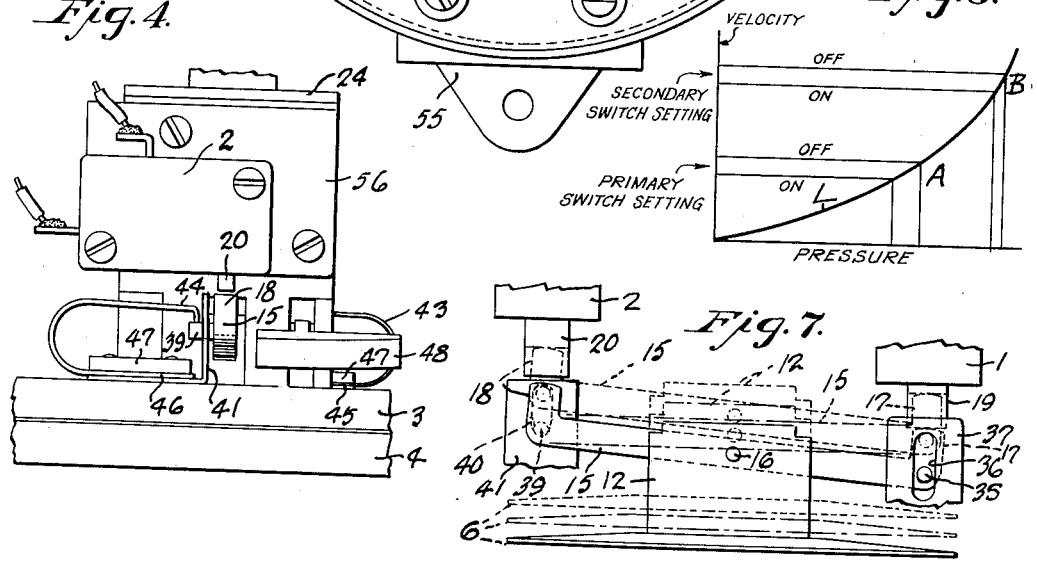
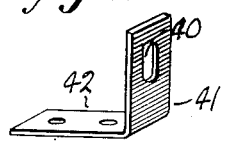
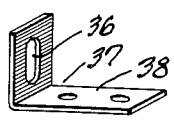
INVENTOR
Henry F. Hamburg
BY
Wooster Davis
ATTORNEYS

United States Patent Office 2,766,349
Patented Oct. 9, 1956

2,766,349

DIFFERENTIAL PRESSURE SWITCH

Henry F. Hamburg, Stratford, Conn., assignor to Matthew Kuziak, Stratford, Conn.

Application February 16, 1954, Serial No. 410,558

14 Claims. (Cl. 200—83)

This invention relates to a differential pressure responsive control, and has for an object to provide such a device which will operate two or more control means, such, for example, as control switches, at certain points in variations in differential pressures.

A particular object of the device is to provide a mechanism which can operate two or more control devices, such, for example, as electric switches, on either straight or curved line pressure variations in succession.

It is another object of the invention to provide a device whereby, by the addition of springs, curved line characteristics for operation of these switches according to a given or predetermined curve may be secured.

A further object of the invention is to provide counter-balancing control means for pressure operated switches or similar control elements which will eliminate flutter caused by vibrations, and thus prevent malfunction of the unit, such, for example, as might cause the switches to operate too soon or too late, or give repetitive operation of the switch or switches when it is desired that it remain in the "on" or "off" position, and thus there will be no interruption of either condition.

A still further object is to provide a construction and arrangement whereby the elements may be made smaller and lighter in weight and still secure effective operation and control, and also a construction whereby effective and advantageous use of leverages and mechanical movements is secured for mechanical advantage, with the result of securing greater sensitivity for operation and more accurate control.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 3 is a horizontal section substantially on line 3—3 of Fig. 1;

Fig. 4 is a side elevation of a portion of the device looking from the left of Figs. 1 and 3;

Fig. 5 is a perspective view of one of the pivot stop means;

Fig. 6 is a similar view of another pivot stop means;

Fig. 7 is a side elevation indicating different positions of the control lever during operation of the device, and Fig. 8 is a pressure velocity curve indicating one application of the device.

Figure 1:
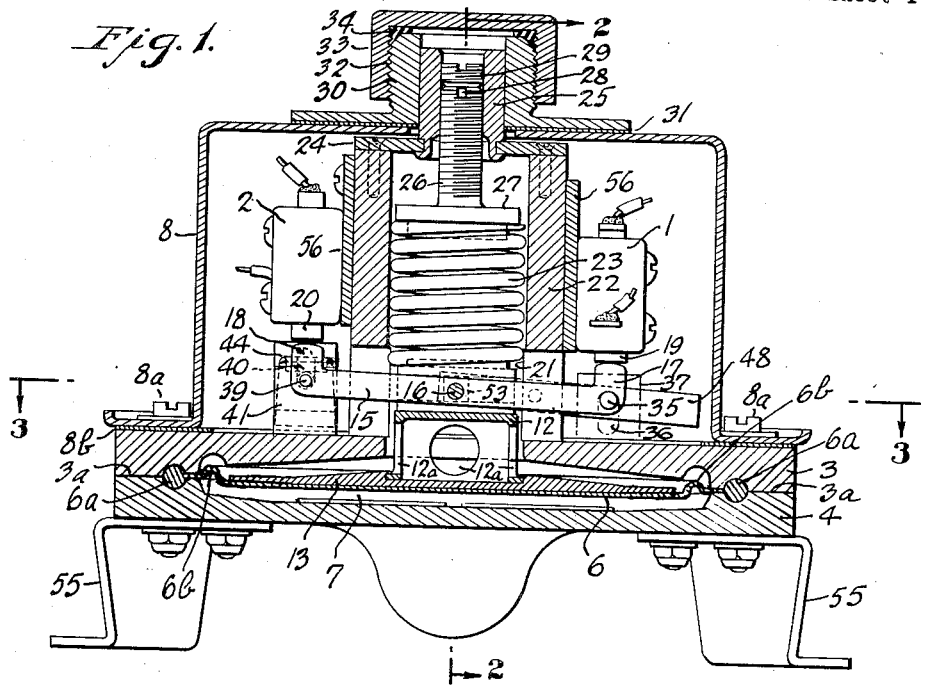
Fig. 1 is a vertical section through the device substantially on line 1—1 of Fig. 3, showing the elements in the half operated position, with the primary switch operated.

As previously indicated, the device is designed to operate control devices such, for example, as control switches, at certain points in variations in differential pressures. It has a number of uses, but the device illustrated was designed primarily for indicating to a robot pilot for an airplane, for example, different zones in which to operate on various pressures due to variations in speed of the plane. For example, at higher speeds of an airplane the control surfaces of the rudder, ailerons, and so forth, are more effective than at lower speeds, and therefore for control less movement or adjustment is required for a given effect for the higher speeds. The air pressure changes in proportion to speed when plotted are not linear or in a straight line, but are represented by a curved line, as shown in Fig. 8, which is a curve plotted to pressure and velocity, as indicated. In other words, at lower speeds the pressure increases faster than velocity, and at higher speeds the velocity increases faster than the pressure, and it is therefore desired to tell the robot, or that is, adjust the automatic pilot for operation at certain points on this curve, or set it for operation in a zone between certain points, which is one of the functions of this device.

The device as shown comprises a primary switch 1 and a secondary switch 2, which may be of the so-called "micro" type switch, connected by an electrical connector C and suitable circuits or wiring (not shown) to the control mechanism in the automatic pilot. The device comprises an upper housing 3 and a lower housing 4, which may be circular in shape, as indicated, and are connected together by any suitable means, such, for example, as the screws 5, in superimposed relation and clamping between them at its periphery a flexible diaphragm 6 forming a pressure responsive means, the opposed faces of the housings being recessed to form a chamber 7 for the central portion of the diaphragm. This diaphragm is preferably of thin flexible material such, for example, as artificial rubber and like material, and is constructed and arranged so that changes in temperature or other conditions which might affect or change the clamping pressure of the two superimposed members 3 and 4 between which the diaphragm is mounted, will not change the characteristics of the diaphragm, and therefore its operative effect on the control mechanism, to any appreciable extent. For this purpose the diaphragm is provided on its peripheral outer edge with a solid circular ring 6a forming the rim of the diaphragm and this is snugly fitted and clamped in aligned similarly shaped grooves in the opposed faces of the members 3 and 4, but which permit the faces of these members outwardly of this ring to contact and come together as indicated at 3a. Therefore changes in clamping pressure between these members 3 and 4, as for example changes in length of the clamping screws 5 by temperature changes, will not change their clamping effect on the diaphragm and cause its material to flow or otherwise change its characteristics. Also the diaphragm is provided with a circular corrugation or bead 6b in its free portion between the ring 6a and the outer edge of plate 13 which will compensate for variations in length of the diaphragm due to its movement, and therefore these movements have no effect on or change the characteristics of the diaphragm. The diaphragm is preferably cemented to the plate. Mechanism for operating the switches according to the movement of this diaphragm is mounted on the upper housing 3 and enclosed in a suitable cover 8, secured to the upper housing by suitable screws 8a and sealed by the gasket 8b between them. The upper housing may be provided with one or more openings 9 providing communication with the space above the diaphragm 6 with the interior of this cover, or the same effect can be secured by making the block or plug 12 hollow with side openings 12a. Pipe connections 10 and 11 are made to the device from an air gauge (not shown) such, for example, as a Pitot tube acting as an air speed gauge, the pipe 10 leading from the high pressure orifice of the tube to the under side of the diaphragm, and the connection 11 from the lower pressure orifice to the upper side of the diaphragm, and therefore the diaphragm operates on differential pressures.

As previously indicated, the device is shown in the drawings in a half operated or intermediate position with the primary switch 1 operated, but the secondary switch 2 has not been operated. In other words, the diaphragm is shown in an intermediate position between the operation of two separate control devices. Mounted on the diaphragm 6 is a diaphragm plug or block 12 mounted on a suitable supporting disc or plate 13 on the top of the diaphragm, and this plug or block is provided with a transverse groove 14 in its top portion in which is mounted a control lever 15 pivoted at an intermediate point 16 to the block. At its opposite ends this lever is provided with upwardly extending lugs or extensions 17 and 18 located respectively under the operating fingers or plungers 19 and 20 of the primary and secondary switches 1 and 2. The plug or block 12 is guided for vertical movements in the upright passage or chamber 21 in the upright housing 22, and a coil spring 23, herein called the main spring, is mounted in this passage on top of this plug or block and tends to force it downwardly together with the diaphragm 6. The top of the housing 22 is closed by a cap 24 to which is attached a sleeve 25 in which is threaded an adjusting screw 26 for adjusting the pressure of the spring 23, this screw having a flange 27 at its lower end resting on top of the spring. The screw is accessible from the top of the cap and may have a transverse slot 28 to receive the bit of a screw driver for adjusting the screw and the pressure of the spring. After adjustment it may be secured in the adjusted position by a lock screw 29. The sleeve 25 is enclosed in a second cap 30 mounted on top of the cover 8, with a suitable gasket 31 to maintain a fluid-tight fit or seal, and the upright portion of the cap 30 is externally threaded as indicated at 32 for a sealing cap 33 which may also be sealed by a suitable gasket, such as an O-ring seal 34.

At the right hand end of the lever 15 it has a pivot pin 35 which also forms a stop pin, the pin projecting at one end from the side of the lever so as to move in an upright slot 36 in an upright primary stop member or bracket 37. This may be of any suitable form, but as shown in Fig. 6 it is an angle plate with a base portion 38 for mounting it on the top of the housing 3, the slot 36 being in the upright portion of this plate. At its other end the lever 15 carries a similar pivot pin 39 which also forms a stop moving in an upright slot 40 in an upright secondary stop member or bracket 41. As shown in Fig. 5, this member also may be made as an angle member with a base portion 42 for mounting it on the housing 3. Pressing downwardly on the pivot and stop pin 35 is the free end of a primary spring 43, and pressing downwardly on the pivot and stop pin 39 is a secondary spring 44. These springs are preferably substantially U-shaped and of flat sheet metal, as shown in Figs. 3 and 4, with their lower legs 45 and 46 respectively secured to the top of the housing 3 by screws and securing blocks 47, and the two springs are similar and of substantially the same construction, except that the primary spring 43 is a lighter spring and therefore exerts less pressure on the pin 35 than does the heavier spring 44 on the pin 39, for a purpose presently to be described.

Vibration of the diaphragm under vibration from the plane, for example, and therefore continuous operation of the switches, is prevented by counterbalancing means, in this case by counterbalances 48 one on each side, and each mounted on a lever 49 pivoted at 50 in the housing 22 and side plates 51 secured thereto, and each lever 49 having a pivot pin 52 at its inner end on which is a slide block 53 slidable in a transverse slot 54 one in each of the opposite sides of the plug or block 12.

The whole device may be mounted on a suitable support on an airplane or other mechanism with which it is to be used by suitable angle brackets 55, and the switches 1 and 2 may be mounted on the sides of the housing 22 by any suitable means, such as the plates 56.

Figure 2:
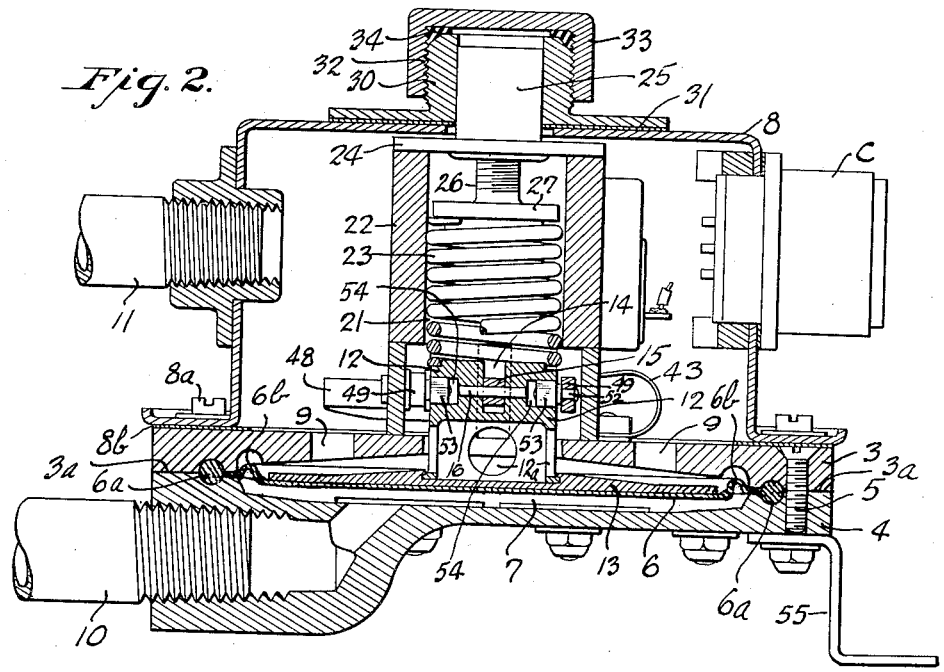
Fig. 2 is a similar section at right angles to the section of Fig. 1 and taken substantially on line 2—2 of Fig. 1.

The operation is as follows: Normally with no pressure on the device the diaphragm 6 is in its lower position or at the bottom of the chamber 7 and is held there by the main spring 23 with the pivot pin 35 on the right hand end of the lever 15 in the lower part of the slot 36, and so is spaced below the top of this slot. At this time the pivot pin 39 rests on the bottom of its slot 40. This is the full line position of Fig. 7. Now if differential pressure is applied through the connections 10 and 11 with the greater pressure on the under side of the diaphragm 6, it will be raised against the action of the spring 23 as the pressure increases along the curved line L, for example, of Fig. 8. This carries the plug or block 12 upwardly and with it the pivot 16 for the lever 15. As the secondary spring 44 is heavier than the primary spring 43, the secondary spring 44 will hold the secondary pivot pin 39 stationary against the bottom of the slot 40, but the right hand or primary pivot 35 will rise in the slot 36 against the action of the lighter spring 43. The use of this lighter spring 43 is preferred for a stabilizing action, but it could be dispensed with as the weight of the lever and the block 12, together with the action of the spring 23, will maintain them in their position on the diaphragm. These additional springs may be used to obtain curved characteristics for operation of the switches, or, that is, according to a given or predetermined curve, such as that shown in Fig. 8 for example. In other words, during this first upward movement of the diaphragm the lever 15 will turn about the pin 39 as a stationary pivot, as well as pivot pin 16, raising the right hand end of this lever and with it the pivot and stop pin 35, so that the lever extension 17 on the right hand end of the lever 15 engages the lower end of the operating plunger or finger 19 of the primary switch 1 and operates this switch, which may be indicated at the point A on the curve of Fig. 8. After operation of the primary switch 1 the primary pivot pin 35 engages the top of the slot 36, arresting further upward movement of the pin 35 and the right hand end of the lever 15. This is the intermediate or dot-and-dash position of Fig. 7 and the position shown in Figs. 1 to 4 of the drawings. If the pressure under the diaphragm 6 now further increases, as the right hand end of the lever 15 and the pin 35 can no longer move upwardly its left hand end 18 and the pin 39 will now be shifted upwardly against action of the heavier secondary spring 44, the lever 15 now operating about the pin 35 as a stationary pivot. If this movement continues the lug or left hand end 18 of the lever 15 will engage the operating plunger or finger 20 of the secondary switch 2 and will operate this switch at the point B on the diaphragm of Fig. 8. The upper end of slot 40 acts as a limit stop for pin 39 to limit further movement. This is the dotted line position of Fig. 7. This will operate whatever is being controlled in the example used so that speeds and pressures will not go above point B. In other words, in the example chosen, it may cause the robot to operate the plane at the point A or at the point B, or it could be used to operate the plane in the zone between these points. The double lines at A and B marked "on" and "off" represent the lag between operation of the switches going up and coming down.

This device comprises a mechanism or linkage whereby it can operate two or more control means, such, for example, as switches, at predetermined points on either straight or curved lines in succession.

It will be understood that other types of pressure responsive means could be used, such, for example, as bellows, pistons, and so forth. The use of the counterbalances 48 with the pressure operated switches or other controls, provides inertia to eliminate flutter caused by vibration of the plane, for example. Flutter causes malfunctioning of the unit. That is, the switches might operate too soon or too late, or there might be rapid repetitive operation of the switch when it is desired that it remain on or off, with no interruption of either condition.

Also, by use of these counterweights the device and parts can be made smaller in size, lighter springs can be used, and overall lighter weight can be effectively secured on the entire unit. Still further, with the counterweights use can be made of leverages and mechanical movements to secure mechanical advantage, and can get greater sensitivity for operation and more accurate control. More or less weight can be used in these elements to secure proper counterbalance for the operation involved.

Having thus set forth the nature of my invention, I claim:

1. In a control device, a pressure responsive means, a lever pivotally connected to said means for operation thereby, a control means operated by movement of one end of the lever under action of said pressure responsive means, a combination pivot and stop means independent of the control means to limit movement of said end of the lever after operation of the control means, spring means to retain the other end of the lever stationary during said movement of the first end and then permit movement of said second end about the stop means as a pivot on further movement of the pressure responsive means, and a second control means independent of the first control means operated by said movement of the second end of the lever.

2. In a control device, a pressure responsive means, a primary and a secondary control switch for controlling separate circuits, a lever pivotally connected to said means for operation thereby, means at one end of the lever for operating the primary switch, means at the other end of the lever for operating the secondary switch, a combination pivot and stop means independent of this switch to limit movement of the first end of the lever after operation of the primary switch, and a spring to retain the second end of the lever stationary during said movement and then permit movement of the second end of the lever about the stop means as a pivot on further movement of the pressure responsive means to operate the secondary switch.

3. In a control device, a pressure responsive means, a primary control means and an independent secondary control means, a lever pivotally connected to the pressure responsive means for operation thereby, means at one end of the lever for operating the primary control means, means at the other end of the lever for operating the secondary control means, a spring connected with each end of the lever normally holding the lever in retracted position, the spring at the first end of the lever being weaker than that at the second end so that on operation of the pressure responsive means the first end of the lever is shifted first to operate the primary control means, and a combination pivot and stop means independent of the control means to limit movement of the first end of the lever after operation of the primary control means and permit movement of the second end of the lever about said stop means as a pivot on further movement of the pressure responsive means to operate the secondary control means.

4. In a control device, a pressure responsive means including a diaphragm, a support carried by the diaphragm, a lever pivotally mounted on said support, primary and secondary control means, means at one end of the lever for operating the primary means and means at the other end of the lever for operating the secondary means, spring means at each end of the lever normally holding the lever in retracted position, a stop pin normally mounted on the first end of the lever, a stop normally spaced from and in the path of movement of said pin, a combination pivot and stop pin mounted on the other end of the lever, a support for said latter pin, and the spring means at the first end of the lever being weaker than that at the second end to yield on operation of the diaphragm and permit the first end of the lever to be shifted about the second pin as a pivot to operate the primary control means and cause the first pin to engage the stop, the spring means at the second end of the lever being yieldable to then permit the lever to shift about the first pin as a pivot to operate the secondary control means.

5. In a control device, a pressure responsive means including a diaphragm, a main spring connected with said diaphragm to shift it to a retracted position, a support carried by said diaphragm, a lever pivotally mounted on said support, independent primary and secondary control switches, means at each end of the lever for operating the respective switches, cooperating combination pivot and stop means at one end of the lever independent of and separate from this switch for arresting further movement of said end after operation of the primary switch, and a spring retaining the other end of the lever stationary during said movement of the first end and yieldable on further movement of the diaphragm to permit movement of the second end of the lever about the stop means as a pivot to operate the secondary switch.

6. In a control device, a pressure responsive means including a diaphragm, a main spring connected with said diaphragm to shift it to a retracted position, a supporting block carried by said diaphragm provided with a transverse guide at one side thereof, a lever pivotally mounted on the block for movement with the diaphragm, primary and secondary control switches, means at one end of the lever for operating the primary switch, means at the other end of the lever for operating the secondary switch, stop means arresting further movement of the first end of the lever after operation of the primary switch by movement of the diaphragm, a spring retaining the second end of the lever stationary during said movement of the first end and yieldable on further movement of the diaphragm to permit movement of the second end of the lever to operate the secondary switch, a second pivoted lever including a counterweight biasing said lever, and a pivotal connection from said latter lever to the block slidable in said guide.

7. In a control device a pressure responsive means including a diaphragm, a main spring connected with and biasing said diaphragm to a retracted position, a supporting block carried by said diaphragm provided with a transverse groove in its top wall, a lever pivotally mounted in said groove for movement with the diaphragm, independent primary and secondary control switches, means at the opposite ends of the lever for operating said switches respectively, a combination pivot and stop means at one end of the lever separate from the primary switch for arresting further movement of this end after operation thereof by the diaphragm to operate the primary switch, a spring holding the other end of the lever stationary during said movement and yieldable on further movement of the diaphragm to permit movement of the second end of the lever about said stop means as a pivot to operate the secondary switch.

8. In a control device a pressure responsive means including a diaphragm, a main spring connected with and biasing said diaphragm to a retracted position, a supporting block carried by said diaphragm, a lever pivotally mounted on the block for movement with the diaphragm, independent primary and secondary control switches, means at the opposite ends of the lever for operating said switches respectively, a spring connected with each end of the lever biasing it to a retracted position, a combination pivot and stop means at one end of the lever separate from the primary switch to arrest movement of this end of the lever after operation of the primary switch, the spring at the other end of the lever being heavier than that at the first end to retain the second end of the lever stationary during said movement of the first end, said heavier spring being yieldable to then permit movement of the second end of the lever about said stop means as a pivot to operate the secondary switch on further movement of the diaphragm.

9. In a control device, superimposed housings having recesses forming a fluid pressure chamber between them, a pressure responsive diaphragm in said chamber, a supporting block mounted on the diaphragm, an upright housing mounted on the first housing having a guide passage for said block, a main spring in said passage connected with and biasing the block and diaphragm to a retracted position, a lever pivotally mounted on the block for movement with the diaphragm, independent and separate primary and secondary control switches, means at the opposite ends of the lever for operating the respective switches, a combination pivot and stop pin mounted on the lever at each end of the lever, a stop spaced from and in the path of movement of the pin at the primary switch end of the lever arresting movement of this end of the lever after operation of the primary switch, a support for the pin at the other end of the lever forming a pivot for the lever during said movement, and a spring retaining the latter pin in said support during said movement of the first end and yieldable to permit movement of the second pin away from the support and movement of the second end of the lever to operate the secondary switch on further movement of the diaphragm.

10. In a control device, superimposed housings having recesses forming a fluid pressure chamber between them, a pressure responsive diaphragm in said chamber, a supporting block mounted on the diaphragm, an upright housing mounted on the first housing having a guide passage for said block, a main spring in said passage connected with and biasing the block and diaphragm to a retracted position, a lever pivotally mounted on the block for movement with the diaphragm, separate primary and secondary control switches, means at the opposite ends of the lever for operating the respective switches, a combination pivot and stop pin mounted on each end of the lever, a spring at each end of the lever pressing on the respective pins and biasing the lever toward a retracted position, a stop in the path of movement of the pin at one end of the lever in position to arrest movement of this end and forming a pivot for the lever after operation of the primary switch, a support for the pin at the other end of the lever whereby it forms a pivot for the lever during said movement, the spring at the first end of the lever being lighter than that at the other end and this latter spring holds the second end stationary during movement of the first end to operate the primary switch and then yields to permit the second end to shift to operate the secondary switch on further movement of the diaphragm.

11. In a control device, superimposed housings having recesses forming a fluid pressure chamber between them, a pressure responsive means including a diaphragm in said chamber, a supporting block carried by the diaphragm, an upright housing mounted on the first housings having a guide passage for the block, a main spring in the passage connected with the block to shift the block and diaphragm to a retracted position, an operating lever pivotally mounted on the block for movement with the diaphragm, independent primary and secondary control switches at opposite ends of the lever controlling separate circuits, means at the opposite ends of the lever for operating the switches on movement of the diaphragm, and control means for the lever whereby the switches are operated in succession by continued movement of the diaphragm.

12. In a control device, a pressure responsive means, a control lever pivotally connected to said means for operation thereby, independent and separate primary and secondary control means at the opposite ends of the lever, means on the lever at said ends for operating the respective control means, and means at the opposite ends of the lever controlling operation of this lever to operate the respective control means in succession including yieldable means separate from the control means to retain one end of the lever stationary while the other end is shifted to operate the primary control means, and a combination pivot and stop means separate from the control means to then hold said other end stationary and permit shifting of the first end of the lever about said stop means as a pivot to operate the secondary control means on further movement of the pressure responsive means.

13. In a control device, a pressure responsive means including a diaphragm, a supporting block mounted on the diaphragm, a control lever pivotally mounted on the block for movement with the diaphragm, separate primary and secondary switches at opposite ends of the lever controlling separate circuits, means at these ends for operating the respective switches, and means at the opposite ends of the lever controlling operation of this lever to operate the switches in succession by movement of the diaphragm, including yieldable means retaining one end of the lever stationary while the other end is shifted to operate the primary switch, and a combination pivot and stop means then holding the other end of the lever stationary while the first end is shifted about said stop means as a pivot to operate the secondary switch on further movement of the diaphragm.

14. In a control device, a pressure responsive means including a diaphragm, a supporting block mounted on the diaphragm, a main spring connected with and biasing the block and diaphragm to a retracted position, a control lever pivotally mounted on the block for movement with the diaphragm, separate and independent primary and secondary control switches, means on the opposite ends of the lever for operating the respective switches, means controlling the operation of this lever to operate the switches in succession by movement of the diaphragm, including spring means at opposite ends of the lever connected with and biasing it to a retracted position, one of said spring means being heavier than the other and holding one end of the lever stationary while the other end is shifted to operate the primary switch and a combination pivot and stop means then holding the other end stationary while the first end is shifted about said stop means as a pivot to operate the secondary switch on further movement of the diaphragm.

References Cited in the file of this patent

UNITED STATES PATENTS

| | | |
|---|---|---|
| 275,181 | Field | Apr. 3, 1883 |
| 1,475,313 | Newhard | Nov. 27, 1923 |
| 1,747,153 | Phelan | Feb. 11, 1930 |
| 2,289,882 | Myers | July 14, 1942 |
| 2,499,040 | Steinback | Feb. 28, 1950 |
| 2,542,254 | Lamb | Feb. 20, 1951 |
| 2,653,552 | Geeraert | Sept. 29, 1953 |